(12) United States Patent
Nagazoe

(10) Patent No.: US 9,119,240 B2
(45) Date of Patent: Aug. 25, 2015

(54) LIGHTING CONTROL SYSTEM

(71) Applicant: Panasonic Corporation, Osaka (JP)

(72) Inventor: Kazufumi Nagazoe, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 176 days.

(21) Appl. No.: 13/955,601

(22) Filed: Jul. 31, 2013

(65) Prior Publication Data

US 2014/0070707 A1    Mar. 13, 2014

(30) Foreign Application Priority Data

Sep. 11, 2012  (JP) ................................. 2012-199705

(51) Int. Cl.
| | | |
|---|---|---|
| *H05B 37/02* | (2006.01) | |
| *H05B 39/04* | (2006.01) | |
| *H05B 41/36* | (2006.01) | |
| *H04B 10/116* | (2013.01) | |

(52) U.S. Cl.
CPC .............. *H05B 37/02* (2013.01); *H04B 10/116* (2013.01); *H05B 37/0245* (2013.01); *H05B 37/0272* (2013.01)

(58) Field of Classification Search
USPC .................................................. 315/149–160
See application file for complete search history.

(56) References Cited

U.S. PATENT DOCUMENTS

| | | | | |
|---|---|---|---|---|
| 6,969,183 | B2* | 11/2005 | Okubo et al. ................. | 362/466 |
| 2009/0218951 | A1* | 9/2009 | Weaver ......................... | 315/154 |
| 2010/0148672 | A1* | 6/2010 | Hopper ......................... | 315/113 |
| 2011/0204793 | A1* | 8/2011 | Gardner, Jr. .................. | 315/150 |
| 2012/0105217 | A1* | 5/2012 | Kao et al. ...................... | 340/13.3 |
| 2013/0100097 | A1* | 4/2013 | Martin ........................... | 345/207 |
| 2013/0141011 | A1* | 6/2013 | Fushimi ......................... | 315/294 |
| 2013/0271004 | A1* | 10/2013 | Min et al. ...................... | 315/112 |
| 2014/0132180 | A1* | 5/2014 | Ukai .............................. | 315/292 |

FOREIGN PATENT DOCUMENTS

| | | |
|---|---|---|
| JP | 10-108279 A | 4/1998 |
| JP | 2002-373794 A | 12/2002 |

(Continued)

OTHER PUBLICATIONS

European Search Report for corresponding European Application No. EP 13 00 3653.6 dated Jan. 8, 2014.

*Primary Examiner* — Brandon S Cole

(74) *Attorney, Agent, or Firm* — Renner, Otto, Boisselle & Sklar, LLP

(57) ABSTRACT

Lighting control system includes lighting fixture having identification information, controller for setting lighting condition for dimming level and color temperature of illumination light of lighting fixture, and dimmer for outputting dimming signal to lighting fixture. Lighting fixture includes dimmer for modulating illumination light to superpose thereon information signal containing identification information and lighting information of lighting fixture. Controller includes wireless communication unit for outputting control signal to dimmer, display unit with touch panel, for displaying image of lighting fixture, and visible light receiver for reading identification information and lighting information from information signal superposed on illumination light. Display unit is configured to associate identification information read through visible light receiver with image of lighting fixture to display image so as to reflect lighting information.

8 Claims, 7 Drawing Sheets

(56) References Cited

FOREIGN PATENT DOCUMENTS

| | | |
|---|---|---|
| JP | 2008-509478 A | 3/2008 |
| JP | 2008-135228 A | 6/2008 |
| JP | 2008-537307 A | 9/2008 |
| JP | 2009-295399 A | 12/2009 |
| JP | 2010-512038 A | 4/2010 |
| WO | WO 2006/017613 A1 | 2/2006 |
| WO | WO 2006/111934 A1 | 10/2006 |
| WO | WO 2008/068056 A1 | 6/2008 |

* cited by examiner

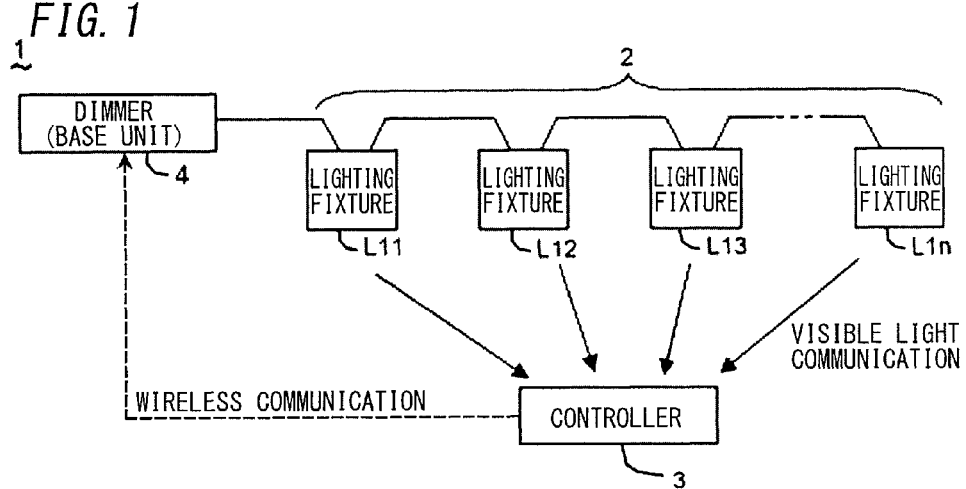
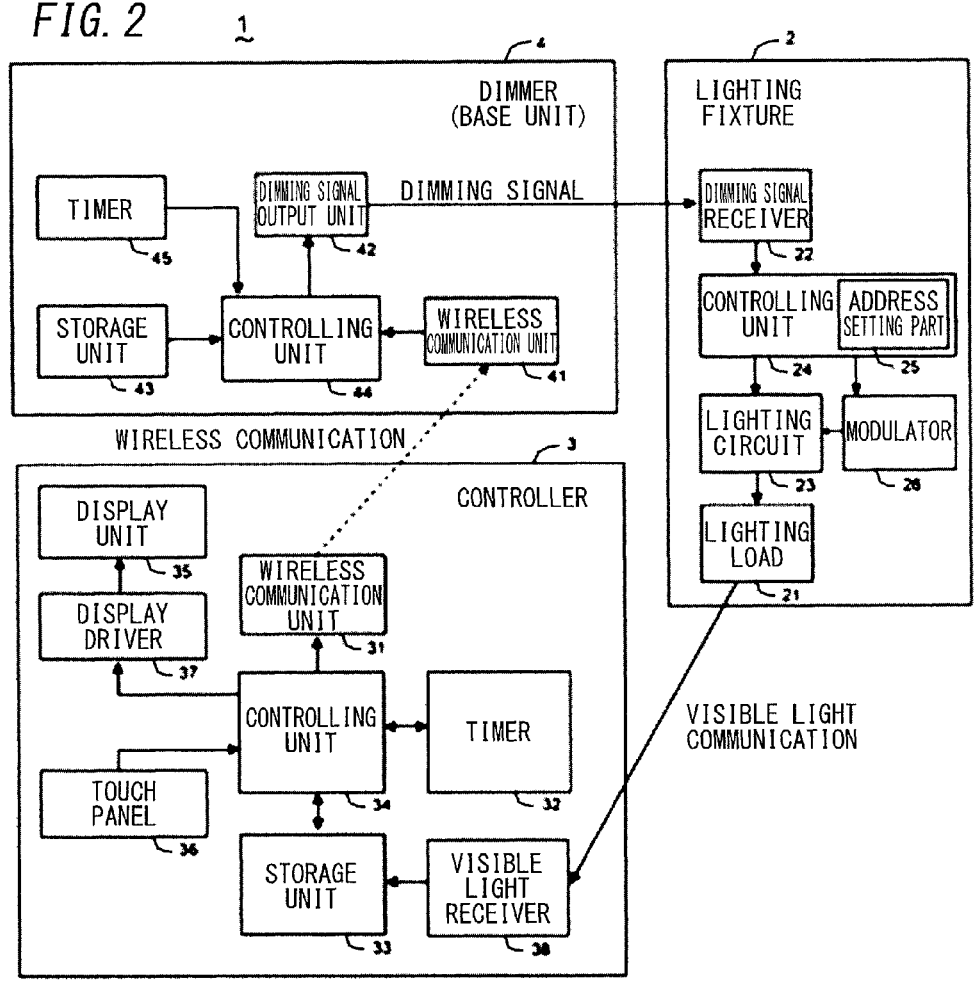

LIGHTING CONTROL SYSTEM

TECHNICAL FIELD

The invention relates to a lighting control system configured to control a dimming level (ratio) and color temperature of a lighting fixture.

BACKGROUND ART

Conventionally, there is known a lighting system configured to control dimming states (illuminance) of lighting fixtures according to a schedule set in advance to achieve labor saving and energy saving (e.g., Japanese Patent Application Publication No. 2002-373794 (hereinafter referred to as "document 1")). In the lighting system of document D1, it is desirable that identification information such as an ID address or the like be previously set to each of the lighting fixtures connected to a main control device. In this case, it is possible to allow the lighting system to perform an ON-OFF control and an illuminance control (a dimming control) of each lighting fixture according to the schedule set in advance.

In the lighting system, there is, however, a problem that verification procedure is complicated. Because, when verifying whether or not the lighting system performs a lighting control of each lighting fixture in line with the setting, it is necessary to infer identification information related to a target lighting fixture to check a lighting state or the like of the lighting fixture based on the identification information.

There is known a lighting system in which: a lighting arrangement modulates the light output of a lighting unit dependent on an identification code; a user uses a user control device to receive light from the lighting arrangement to derive the identification code; the user control device transmits the derived identification code to a main control device; and the main control device controls the lighting arrangement in several ways (e.g., Japanese Patent Publication Application Number 2008-537307 (hereinafter referred to as "document 2")).

As is known in the art, the parameter set through a controller in a lighting control system is mainly a dimming level (brightness). However, in recent years, there are widely spread variable color-temperature of lighting fixtures, each with various kinds of LEDs (light-emitting diodes), organic EL (electroluminescence) devices or the like, having different luminescent colors. In this case, when setting a lighting condition for a lighting fixture, the controller needs to set a plurality of parameters such as brightness and a color temperature of an illumination light. The parameter setting is difficult for a general user without expertise. In the lighting system of document 2, the user control device just has some command buttons, and accordingly the lighting system is not fit for setting of a plurality of parameters.

SUMMARY OF INVENTION

It is an object of the present invention to provide a lighting control system enabling a general user without expertise to easily and intuitively set a dimming level (ratio) and a color temperature of an illumination light.

In order to solve the problem, a lighting control system of the present invention comprises: a (at least one) lighting fixture (2) having identification information; a controller (3) configured to set a lighting condition for a dimming level and a color temperature of an illumination light of the lighting fixture; and a dimmer (4) configured to output a dimming signal for a lighting control of the lighting fixture in accordance with the lighting condition set through the controller (3). The lighting fixture comprises: a lighting load (21); a dimming signal receiver (22) configured to receive the dimming signal from the dimmer (4); and a modulator (26) configured to modulate the illumination light of the lighting load (21) to superpose an information signal on the illumination light, said information signal containing an information set of the identification information and lighting information of the lighting fixture (2). The controller (3) comprises: a wireless communication unit (31) configured to transmit a control signal containing the lighting condition of the lighting fixture (2) to the dimmer (4) by a wireless communication; a storage unit (33) that stores the identification information of the lighting fixture (2) and an image of the lighting fixture (2) which are related to each other; a display unit (35) configured to display the image of the lighting fixture (2); a touch panel (36) configured to enable a user to designate the image displayed on the display unit (35) therethrough; and a visible light receiver (38) configured to receive the illumination light to read the identification information and the lighting information from the information signal superposed on the illumination light. The display unit (35) is configured to associate the identification information read through the visible light receiver (38) with the image of the lighting fixture (2) to display the image of the lighting fixture (2) so that the lighting information of the lighting fixture (2) corresponding to the image is reflected. The wireless communication unit (31) is configured, when the touch panel (36) on the image of the lighting fixture (2) displayed on the display unit (35) is operated through a touch operation, to produce a control signal for setting the lighting condition of the lighting fixture (2) related to the image based on an operation pattern thereof to transmit the control signal to the dimmer (4).

In an embodiment, the visible light receiver (38) functions as an image acquisition unit configured to acquire the image of the lighting fixture (2).

In an embodiment, the (at least one) lighting fixture (2) comprises (two or more) lighting fixtures (2). The display unit (35) is configured to display images of the lighting fixtures (2) acquired through the image acquisition unit (38) so that respective lighting information of the lighting fixtures (2) corresponding to the images are reflected.

In an embodiment, the controller (3) is configured, when one point by the touch operation on the touch panel (36) is a single stroke of operation pattern that surrounds two or more images of images of (two or more) lighting fixtures (2) displayed on the display unit (35), to group lighting fixtures (2) related to the surrounded images to set lighting conditions for the grouped lighting fixtures (2) in a lump.

In an embodiment, the dimmer (4) comprises: a storage unit (43) that stores identification information of the lighting fixture (2) and an image of the lighting fixture (2) which are related to each other; a display unit (46) adapted to display the image of the lighting fixture (2); and a touch panel (47) configured to enable a user to designate the image displayed on the display unit (46) therethrough.

In the present invention, the lighting fixture (2) transmits the identification information and the lighting information to the controller (3) by a visible light communication, and the display unit (35) of the controller (3) displays them (the identification information and the lighting information). Accordingly, a user can easily check whether or not each lighting fixture (2) is controlled in accordance with a set lighting condition. In addition, if the touch panel (36) on the image of the lighting fixture (2) displayed on the display unit (35) is operated, a lighting setting is performed to the lighting fixture (2) related to the image. It is therefore possible to enable a general user without expertise to easily and intuitively set a dimming level (ratio) and a color temperature of an illumination light.

BRIEF DESCRIPTION OF DRAWINGS

Preferred embodiments of the invention will now be described in further details. Other features and advantages of the present invention will become better understood with regard to the following detailed description and accompanying drawings where:

FIG. 1 is a block diagram of a lighting control system in accordance with an embodiment of the present invention;

FIG. 2 is a block diagram of the lighting control system;

DESCRIPTION OF EMBODIMENTS

Figure 3:
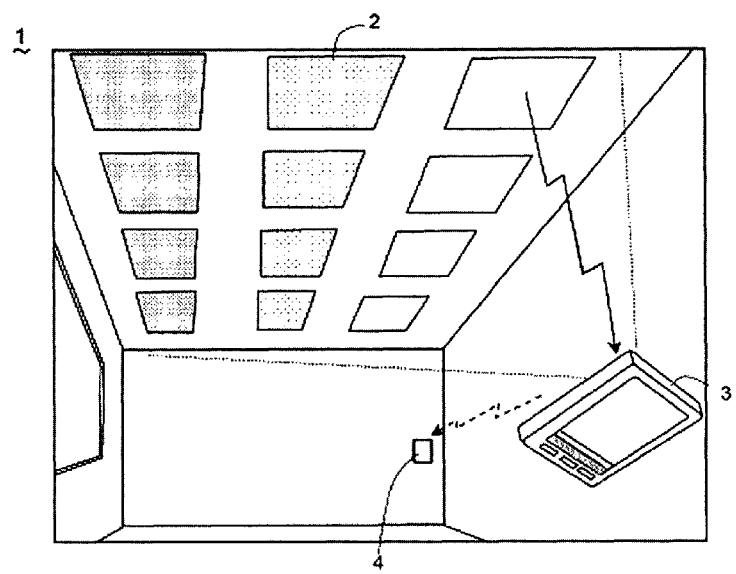
FIG. 3 is a perspective view for explaining an acquisition operation of identification information of a lighting fixture through a controller of the lighting control system.

A lighting control system in accordance with a first embodiment of the present invention is explained with reference to FIGS. 1 to 12. The lighting control system (1) of the embodiment includes: a (at least one) lighting fixture (2) having identification information; a controller (3) configured to set a lighting condition for a dimming level and a color temperature of an illumination light of the lighting fixture (2); and a dimmer (4) configured to output a dimming signal for a lighting control of the lighting fixture (2) in accordance with the lighting condition set through the controller (3). The lighting fixture (2) includes: a lighting load (21); a dimming signal receiver (22) configured to receive the dimming signal from the dimmer (4); and a modulator (26) configured to modulate the illumination light of the lighting load (21) to superpose an information signal on the illumination light. The information signal contains an information set of the identification information and lighting information of the lighting fixture (2). The controller (3) includes: a wireless communication unit (31) configured to transmit a control signal containing the lighting condition of the lighting fixture (2) to the dimmer (4) by a wireless communication; a storage unit (33) that stores the identification information of the lighting fixture (2) and an image of the lighting fixture (2) which are related to each other; a display unit (35) configured to display the image of the lighting fixture (2); a touch panel (36) configured to enable a user to designate the image displayed on the display unit (35) therethrough; and a visible light receiver (38) configured to receive the illumination light to read the identification information and the lighting information from the information signal superposed on the illumination light. The display unit (35) is configured to associate the identification information of the lighting fixture (2) read through the visible light receiver (38) with the image of the lighting fixture (2) to display the image of the lighting fixture (2) so that the lighting information of the lighting fixture (2) corresponding to the image is reflected. The wireless communication unit (31) is configured, when the touch panel (36) on the image of the lighting fixture (2) displayed on the display unit (35) is operated through a touch operation, to produce a control signal for setting the lighting condition of the lighting fixture (2) related to the image based on an operation patter thereof to transmit the control signal to the dimmer (4).

Specifically, as shown in FIG. 1, a lighting control system 1 of the embodiment includes lighting fixtures 2 (L11 to L1$n$ in the example of FIG. 1) installed in a prescribed space, and a controller 3 configured to set a lighting condition for brightness (illuminance) and a color temperature of each lighting fixture 2. The lighting control system 1 further includes a dimmer 4 configured to output a dimming signal for a lighting control of each lighting fixture 2 in accordance with a (corresponding) lighting condition set through the controller 3. The lighting control system 1 can be preferably applied to, for example, a conference room of an office building, a conventional home, a shop or the like.

As shown in FIG. 2, the lighting fixture 2 includes a (at least one) lighting load 21, a dimming signal receiver 22 configured to receive the dimming signal from the dimmer 4, a lighting circuit 23 configured to supply required power to lighting load 21 to power the load 21, and a controlling unit 24 configured to control these components. The lighting fixture 2 further includes a power supply unit (not shown) configured to convert AC power from commercial power supply into prescribed power (a prescribed current) used by the lighting circuit 23. The lighting load 21 is formed of a combination of various kinds of LEDs, organic EL devices or the like, having different luminescent colors, and thereby configured to emit an illumination light with a variable color temperature. The lighting circuit 23 includes a switch circuit and a transformer circuit which are configured to supply a prescribed current to the lighting load 21 in accordance with an instruction of the controlling unit 24. The controlling unit 24 is formed of a general-purpose microcomputer for lighting control, a memory and the like, and stores identification information of the lighting fixture 2. The controlling unit 24 also has an address setting part 25 for setting an ID address (an identification number) in the lighting control system 1. The address setting part 25 is formed of a DIP switch for direct input of an ID address, or a connector, a memory and the like which are adapted to input a unique ID address for the lighting fixture 2 through a special purpose terminal from the outside. The identification information is set in advance at dispatch stage of the lighting fixture 2.

The lighting fixture 2 further includes a modulator 26 configured to modulate the illumination light of the lighting load 21 to superpose an information signal on the illumination light. The information signal contains an information set of the identification information and lighting information of the lighting fixture 2. The modulator 26 is configured to change an electric current supplied from the lighting circuit 23 to the lighting load 21 based on a prescribed modulation control signal set through the controlling unit 24, thereby superposing the identification information and the lighting information of the lighting fixture 2 on the illumination light. Examples of the lighting information include status data such as: profile data of a dimming range, a color temperature range and the like of the lighting fixture 2; and information on a cumulative operating time that is used to inform a user of electricity consumption and lamp replacement timing.

The controller 3 includes a wireless communication unit 31 configured to transmit a control signal to the dimmer 4 by a wireless communication (e.g., a radio communication), a timer 32 configured to measure time, a storage unit 33 that stores therein an image (a still image) of the lighting fixture 2 and the like, and a controlling unit 34 configured to activate the wireless communication unit 31 and the like. The control signal contains the setting information on the lighting condition of the lighting fixture 2. The controller 3 includes a display unit 35 adapted to display the still image of the lighting fixture 2 and the like, and a touch panel 36 configured to enable a user to designate the still image displayed on the display unit 35 therethrough. The display unit 35 is driven through a display driver 37 in accordance with an instruction of the controlling unit 34.

The controller 3 includes a visible light receiver 38 configured, when receiving the illumination light of the lighting fixture 2 under a prescribed condition, to read (extract) the identification information and the lighting information of the lighting fixture 2 from the information signal superposed on the illumination light. This visible light receiver 38 has a light-receiving element such as CCD, CMOS or the like, and also functions as an image acquisition unit configured to acquire the image of the lighting fixture 2 by taking a still image of the lighting fixture 2.

The controller 3 is a terminal capable of taking it to any place indoor, and configured to transmit, by a wireless communication, the control signal to the dimmer 4 that is wired to the lighting fixtures 2. It is preferable that a portable terminal with multifunction be employed as the controller 3. Examples of the portable terminal include a tablet terminal, a smart phone and the like, to which a dedicated software is installed. However, the portable terminal may be a special purpose terminal for the lighting control system 1. The controller 3 includes a control power supply (not shown) configured to generate necessary electric power from an external power supply, and a battery (not shown) with predetermined capacity.

The wireless communication unit 31 is configured to transmit a prescribed control signal to the dimmer 4 in accordance with an instruction of the controlling unit 34 and the lighting condition for the lighting fixture 2 set according to procedures as stated below. For example, NFC/Felica (trademark), IrDA (infrared rays) (trademark), wireless LAN (WiFi (trademark)), or the like is used for the wireless communication. In the embodiment, the wireless communication unit 31 has only to have a function of (at least) one-way wireless communication from the controller 3 to the dimmer 4. For example, an infrared transmission of a general-purpose remote controller, or the like may be used for the wireless communication unit 31.

The timer 32 is formed of a general-purpose clock device and adapted to measure current time to perform a 24 hours schedule control. The storage unit 33 is formed of a nonvolatile memory such as EEPROM or the like, or an internal memory of a microcomputer (e.g., one-chip microcomputer) used for the controlling unit 34. The storage unit 33 is adapted to store a still image of the lighting fixture 2 taken through the visible light receiver 38 along with the identification information allocated to the lighting fixture 2 and the still image. The controlling unit 34 is formed of a general-purpose microcomputer (CPU). The display unit 35 is formed of a liquid crystal display with a backlight such as LEDs or the like, an organic EL display, or the like. The display driver 37 is adapted to iconize the still image stored in the storage unit 33 to display it on the display unit 35. The touch panel 36 is configured to detect a position of a user's fingertip touching the touch panel 36 on the display unit 35 by a resistive membrane system, a static electricity dispersion method, or the like.

The dimmer 4 includes a wireless communication unit 41 configured to communicate with the wireless communication unit 31 of the controller 3 by a wireless communication, a dimming signal output unit 42 configured to transmit a prescribed dimming signal(s) to the lighting fixtures 2, a storage unit 43 that stores identification information of each lighting fixture 2 and the like, and a controlling unit 44 configured to activate the dimming signal output unit 42 or the like. The dimmer 4 also includes a timer 45 adapted to measure the time to activate the dimming signal output unit 42 in accordance with the lighting information set through the controller 3. The wireless communication unit 41 includes a receiver corresponding to the wireless communication unit 31 of the controller 3. The dimming signal output unit 42 is configured to generate a prescribed dimming signal in accordance with the control signal from the wireless communication unit 31 to output the dimming signal. Examples of the prescribed dimming signal include a digital dimming signal (DALI, DMX and the like), PWM signal and the like. The dimmer 4 may have an operating unit (not shown) such as a fader, a volume switch or the like in order to perform a lighting control of the lighting fixtures 2 without using the controller 3. The storage unit 43 is formed of a nonvolatile memory such as EEPROM or the like, or an internal memory of a microcomputer (e.g., one-chip microcomputer) used for the controlling unit 44. The controlling unit 44 is formed of a general-purpose microcomputer (CPU). The timer 45 is formed of a real-time clock IC or the like.

Figure 4A:
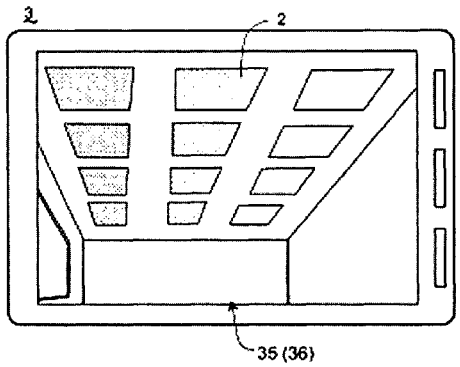
FIGS. 4A and 4B illustrate screen display examples in the controller showing acquired identification information of each lighting fixture.
Figure 4B:
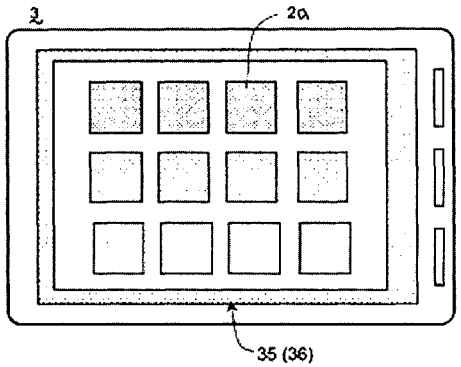

An operation for acquiring identification information of each lighting fixture 2 through the controller 3 is explained with reference to FIGS. 3, 4A and 4B. Here it is assumed that each lighting fixture 2 has its own identification information (that is an unique identifier) assigned in advance, and the storage unit 43 of the dimmer 4 is adapted to store an identification information set. The identification information set includes: an unique identifier set (e.g., an ID address set) which is a set of unique identifiers (e.g., individual ID addresses) of the lighting fixtures 2, each assigned in advance at dispatch stage thereof (2); and a relative coordinate information set which is a set of relative coordinates of the lighting fixtures 2 in a light environment to which the present system is applied. In other words, the storage unit 43 is adapted to store the ID address set (the unique identifier set) and the relative coordinate information set. In the figures depicting an example of a lighting space, a window(s) and a wall are present to the left and right in the figures, respectively, and the nearer the wall side than the window side, more brightly the lighting fixtures 2 light. That is, the lighting fixtures 2 at the wall side light more brightly than the lighting fixtures 2 at the window side.

A user first starts a mode of the controller 3, for acquiring the identification information set (i.e., the unique identifier set and the relative coordinate information set) of the lighting fixtures 2, from a main window (not shown) of the controller 3 (see FIG. 2). The mode is hereinafter called an identification information acquiring mode. The controller 3 transmits a corresponding signal to the dimmer 4 through the wireless communication unit 31. The corresponding signal represents that the identification information acquiring mode is started. The controller 3 activates the visible light receiver 38 (image acquisition unit) to take an image (a picture) of a lighting space in which the lighting fixtures 2 are installed as shown in FIGS. 3 and 4A, and then displays an image of the lighting space on the display unit 35. In this case, the controlling unit 34 launches an image recognition software to extract images of the lighting fixtures 2 included in the image of the lighting space. On the other hand, when receiving the above-mentioned corresponding signal from the controller 3, the dimmer 4 sequentially activates the modulators 26 of the lighting fixtures 2 so as to superpose, on each illumination light of the lighting fixtures 2, an information signal that contains identification information (i.e., a unique identifier (an ID address) and relative coordinate information) and lighting information thereof (2).

The controller 3 reads (extracts) the identification information (a unique identifier and relative coordinate information) and lighting information of each of the lighting fixtures 2 from the information signals through the visible light receiver 38. The controlling unit 34 associates an ID address and a relative coordinate (information) included in identification information from each lighting fixture 2 with a corresponding image of the images of the lighting fixtures 2 extracted from the image of the lighting space.

The controlling unit 34 then produces two-dimensional image data of the lighting space so that icons (images) 2a of the lighting fixtures 2 are placed at the same positions as the lighting fixtures 2 in an actual lighting space. As shown in FIG. 4B, the controlling unit 34 associates each icon 2a of the lighting fixtures 2 with identification information (an ID address and relative coordinate (information), especially the relative coordinate) of a corresponding lighting fixture 2, and then activates the display driver 37 to display the icons 2a on the display unit 35 based on the two-dimensional image data so that lighting information of a lighting fixture 2 corresponding to each icon 2a is reflected. Specifically, brightness and color temperature of each icon 2a are displayed on the display unit 35 such that a virtual lighting fixture of each icon 2a is lit by a lighting condition corresponding to brightness and color temperature of an illumination light of a corresponding actual lighting fixture 2. That is, the controller 3 virtually displays brightness and a color temperature of an illumination light of each of the actual lighting fixtures 2 on the display unit 35. In addition to the virtual display of brightness and color temperature of each icon 2a, corresponding ID address and information on concrete numerical values of brightness and color temperature may be displayed on each icon 2a.

Figure 5:
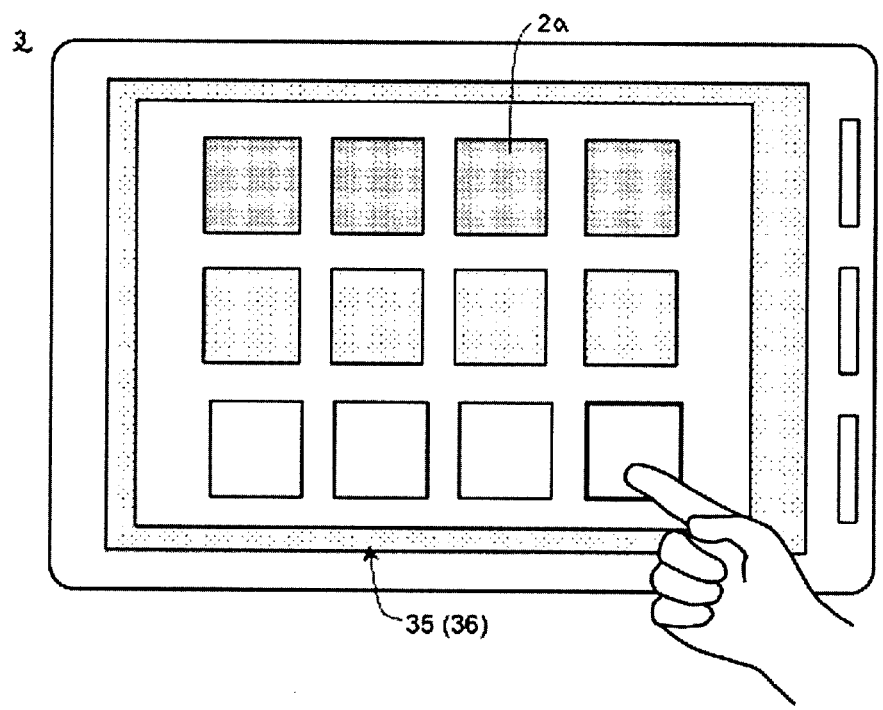
FIG. 5 illustrates a screen display example in the controller, of a virtual display of lighting fixtures.
Figure 6:
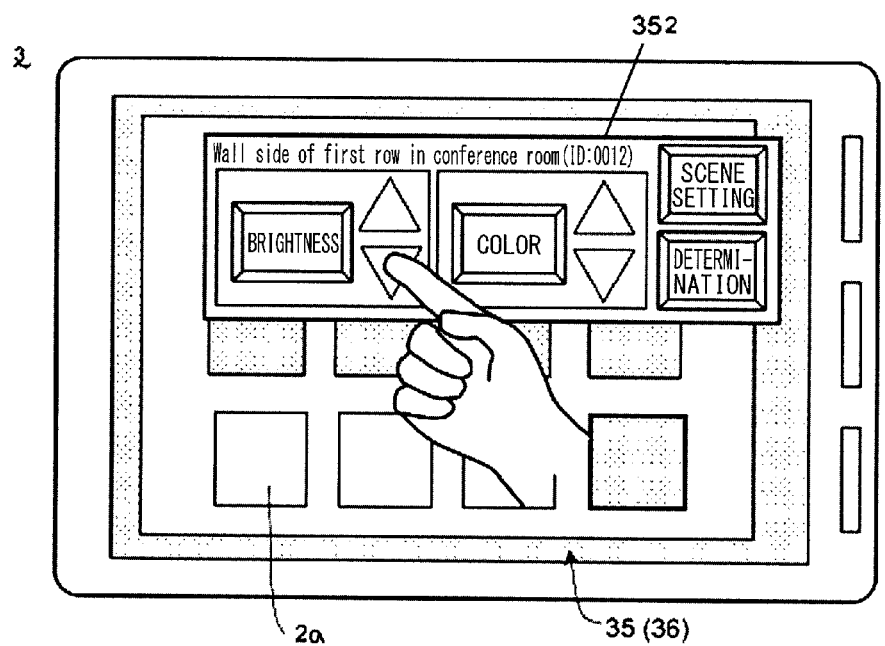
FIG. 6 illustrates a screen display example in the controller, showing a setting operation of lighting condition for a lighting fixture(s)

As shown in FIG. 5, when changing a lighting condition for a lighting fixture 2, the user touches an icon 2a corresponding to the lighting fixture 2 to be changed, on the virtual display window of the lighting fixtures 2 displayed on the display unit 35. The icon 2a is then displayed in thick, and as shown in FIG. 6, a setting change window 352 for changing a lighting condition for a lighting fixture 2 corresponding to the touched icon 2a is pop-up displayed. It is preferable that the setting change window 352 be displayed in a region except for the touched icon 2a.

If the user touches an up or down key for increasing or decreasing brightness or an up or down key for increasing or decreasing a color temperature in the setting change window 352 to touch a select button, the user can change lighting information of the lighting fixture 2 corresponding to the touched icon 2a. In this case, when any key is touched, a display of "BRIGHTNESS" or "COLOR" corresponding to the touched key is changed to a numerical value of a corresponding dimming ratio [%] or color temperature [K]. In addition, brightness or a color temperature of the touched icon 2a on the display unit 35 is varied in response to the change (i.e., the touched key).

When the icon 2a on the display unit 35 (the touch panel 36) is touched, the wireless communication unit 31 transmits, to the dimmer 4, a control signal for setting a light condition for a lighting fixture 2 corresponding to the icon 2a based on the operation content (numerical values of dimming ratio [%] or color temperature [K] set through the setting change window 352). The dimmer 4 transmits a dimming signal for performing a lighting control of the corresponding actual lighting fixture 2 thereto in accordance with the lighting condition set through the controller 3. Specifically, the dimming signal includes a set of dimming ratios for controlling light outputs of elements such as various kinds of LEDs or the like as described previously, constituting a lighting load 21 of the lighting fixture 2. As a result, it is possible to adjust the actual lighting fixture 2 to brightness and a color temperature of an illumination light in line with the lighting condition displayed virtually through the controller 3.

Thus, a lighting condition for a lighting fixture 2 related to an icon 2a is set by touching the icon 2a and the like on the display unit 35, and accordingly a general user without expertise can easily and intuitively set a dimming level (ratio) and a color temperature of an illumination light of a lighting fixture 2. A communication between the controller 3 and the dimmer 4 may be one-way communication from the controller 3 to the dimmer 4, because identification information and the like of a lighting fixture 2 are transmitted to the controller 3 by a visible light communication using the illumination light of the lighting fixture(s) 2. In this case, it is possible to employ, as communication means therebetween, a general-purpose communication terminal that is a relatively inexpensive, such as a general-purpose remote controller for infrared transmission.

If the lighting condition for the lighting fixture 2 is changed, the dimmer 4 controls the lighting fixture 2 so that the lighting fixture 2 transmits a communication signal to the controller 3 again by a visible light communication. The communication signal contains an information set of the identification information (the ID address and the relative coordinate information) and the lighting information of the lighting fixture 2. The controller 3 receives the communication signal to verify whether or not the lighting fixture 2 is lit in line with the lighting condition for the lighting fixture 2. In short, the lighting fixture 2 automatically transmits its own identification information (the ID address and the relative coordinate information) and lighting information to the controller 3 through a visible light communication. The display unit 35 then displays information relevant to the identification information and the lighting information. Therefore, the user can easily verify whether or not the lighting fixture 2 is controlled in line with the lighting condition set through the controller 3.

In the example of FIG. 6, the setting change window 352 includes a display field representing the ID address and a nickname of the target lighting fixture 2 ("Wall side of first row in conference room (ID: 0012)"). The ID address is assigned to the lighting fixture 2 in advance at dispatch stage thereof as described previously. On the other hand, if the user touches the display field, a soft keyboard (not shown) is pop-up displayed on the display unit 35 and an entry filed for the nickname is enabled. Therefore, the user can enter a desired nickname in the entry filed by using the soft keyboard. The nickname is related to the ID address and the icon 2a of the lighting fixture 2, which are stored in the storage unit 33.

Figure 7:
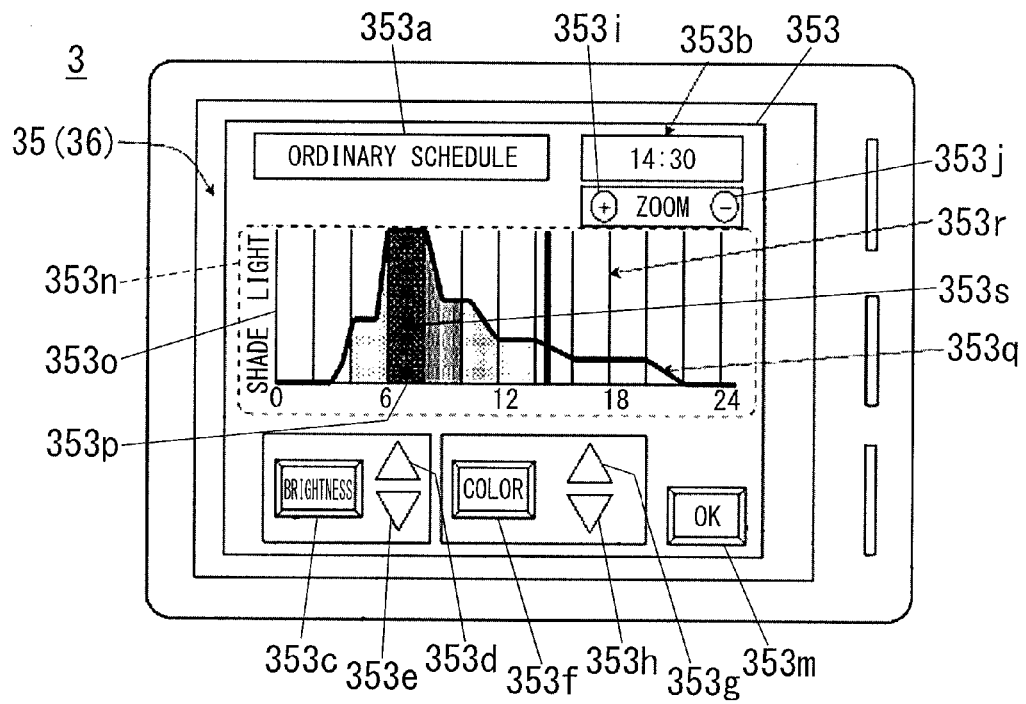
FIG. 7 illustrates a screen display example in a display unit of the controller, showing a schedule setting.

The user touches a scene setting button in the setting change window 352 as shown in FIG. 6, and thereby, as shown in FIG. 7, the display unit 35 closes the setting change window 352 to display a schedule setting window 353 for setting a scene by which the lighting condition for the lighting fixture 2 is varied along an axis of time. The schedule setting window 353 can be also opened from the main window.

The schedule setting window 353 includes a schedule name display field 353a, a current time display filed 353b, a schedule display field 353n that graphically displays various kinds of information, and various buttons. The schedule display field 353n has a longitudinal axis 353o representing brightness (level), a lateral axis 353p representing time, and a line chart (hereinafter called a "graph line") 353q that is drawn along the axes 353o and 353p and depicts a time series variation of the brightness level. The schedule display field 353n further includes timing lines for scene setting (each hereinafter called a "scene setting timing line") 353r in parallel with the longitudinal axis 353o. One scene reproduction interval is mainly defined a horizontal line segment of the graph line 353q, and adjoining scene reproduction intervals are connected to each other via a fading operation interval. The graph line 353q represents that the lighting fixture 2 is controlled so that it illuminates the lighting space more brightly as a time slot includes a higher segment of the graph line 353q, while illuminating the lighting space more darkly as a time slot includes a lower segment thereof. Segment regions 353s, each of which is surrounded by the graph line 353q, the lateral axis 353p and adjoining two scene setting timing lines 353r, are classified by color based on respective corresponding color temperatures. Blue, white, yellow, orange and red are used for the classification in descending order of color temperature. For example, blue is used for the highest color temperature (range), while red is used for the lowest color temperature (range).

The various buttons includes a dimming level (ratio) setting button 353c, a dimming level up button 353d, a dimming level down button 353e, a color temperature setting button 353f, a color temperature up button 353g, a color temperature down button 353h, a zoom-in button 353i, a zoom-out button 353j, a detailed settings button, and a determination button 353m for completing schedule setting. If the user touches the zoom-in button 353i with the user's finger, an enlarged schedule display field 353n (not shown) is displayed. In addition, the user can change a span of a scene reproduction interval and the lighting condition by touching and dragging the graph line or a scene setting timing line on the schedule setting window 353.

The controller 3 is configured, if any time in the schedule display field 353n on the display unit 35 (the touch panel 36) is designated, to change the schedule display field 353n to a scene display window that represents an illumination scene on the designated time by an illustration of the lighting fixtures arranged by category. The scene display window is similar to the virtual display window as shown in FIG. 5, and further represents scene reproduction time.

The dimmer 4 is configured, whenever a scene lighting condition changes in a scene reproduction, to control the lighting fixtures 2 so that the lighting fixtures 2 sequentially transmit communication signals to the controller 3 by visible light communication. A communication signal of each lighting fixture 2 contains an information set of its own identification information (ID address and relative coordinate information) and lighting information. It is accordingly possible to reproduce lighting condition for the lighting fixture 2 in real time with respect to the lighting space in the scene reproduction. Even in the scene reproduction, the setting change window 352 as shown in FIG. 6 can be displayed by touching an icon 2a corresponding to a lighting fixture 2. It is therefore possible to intuitively change a lighting condition for a particular or voluntary lighting fixture 2 in the scene reproduction.

Figure 8:
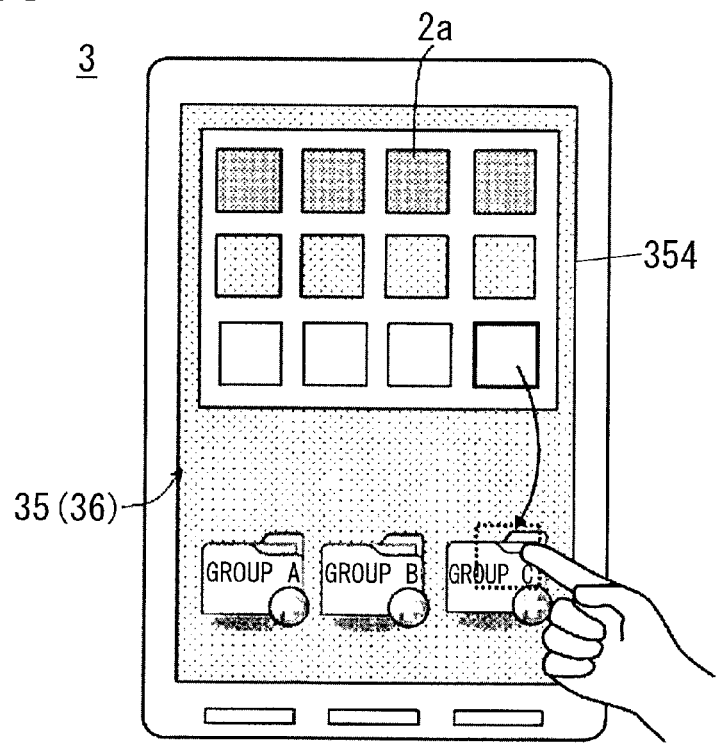
FIG. 8 illustrates a screen display example in the controller, showing a setting operation for grouping lighting fixtures.

A procedure of grouping of two or more lighting fixtures 2 for setting lighting conditions for the lighting fixtures 2 in a lump is explained. If a user scrolls any place except for icons 2a on a virtual display window of the lighting fixtures 2 as shown in FIG. 5, the display unit 35 displays a group setting window 354 as shown in FIG. 8. The group setting window 354 includes a virtual display field of the lighting fixtures 2, and folders in a region except for the virtual display field. In the group setting window 354, if the user touches and drags an icon 2a corresponding to a lighting fixture 2 from the virtual display field to a folder, the lighting fixture 2 corresponding to the dragged icon 2a is assigned to a group corresponding to the destination folder of the dragged icon 2a. By repeating the procedure, it is possible to make a group of two or more lighting fixtures 2. The group setting window 354 can be opened from the main window of the controller 3.

Figure 9:
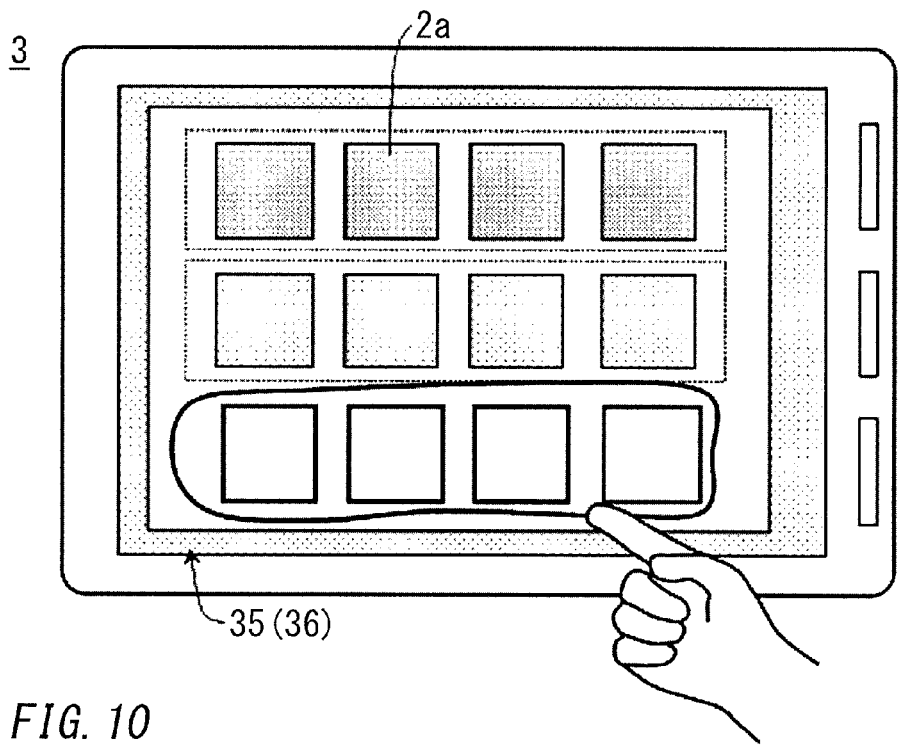
FIG. 9 illustrates a screen display example in the controller, showing another setting operation for grouping lighting fixtures.

As shown in FIG. 9, in the virtual display window of the lighting fixtures 2, when (one point by) the touch operation on the display unit 35 (the touch panel 36) is a single stroke of operation pattern that surrounds two or more icons 2a of all icons 2a corresponding to the all lighting fixtures 2 displayed on the display unit 35, the controller 3 groups lighting fixtures 2 related to the surrounded icons 2a as a group. In this case, it is possible to group two or more lighting fixtures 2 more intuitively.

Figure 10:
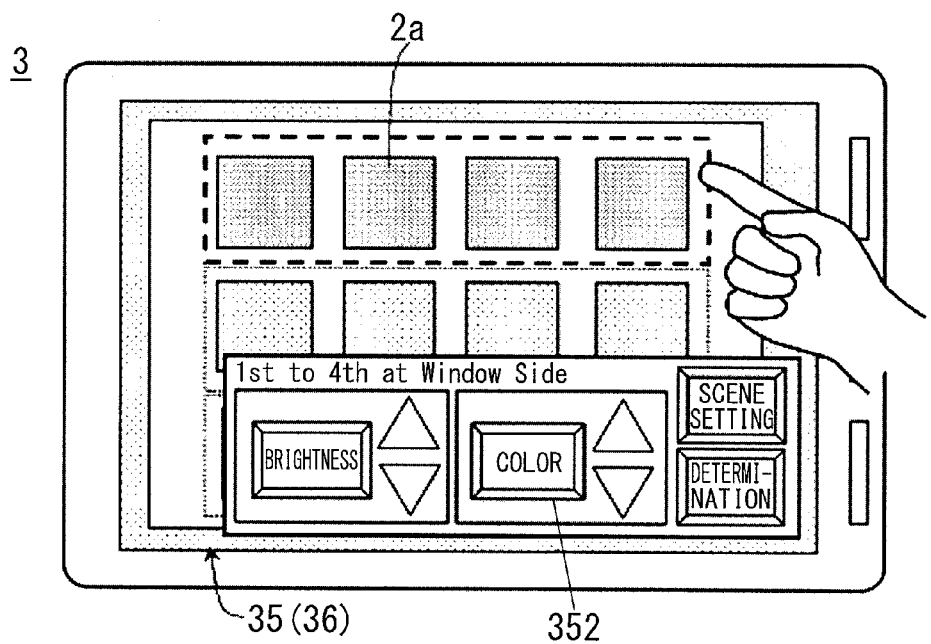
FIG. 10 illustrates a screen display example in the controller, showing a setting operation of a lighting condition for grouped lighting fixtures.

As shown in FIG. 10, if two or more lighting fixtures 2 are grouped, the display unit 35 displays a group frame (a dotted line) surrounding the icons 2a corresponding to the grouped lighting fixtures 2. When the user touches the group frame, the setting change window 352 is pop-up displayed. In this case, the lighting conditions for the lighting fixtures 2 included in the group can be set in a lump. A nickname can be given to the group in the same way as the aforementioned nickname for the lighting fixture 2.

Figure 11A:
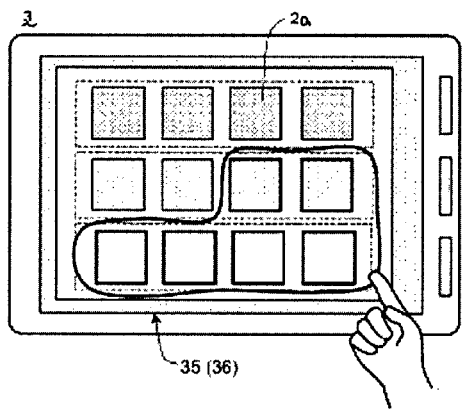
FIGS. 11A and 11B illustrate a screen display example in the controller, showing another setting operation for grouping lighting fixtures.
Figure 11B:
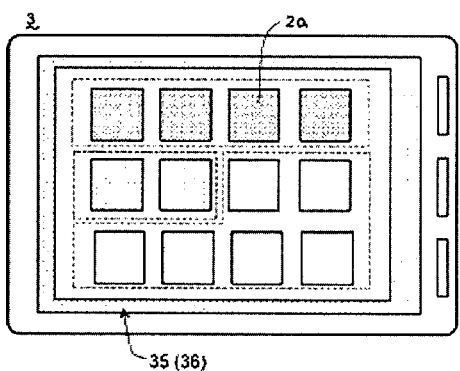

A procedure example for changing setting of the group or lighting conditions for the group from the virtual display window of the lighting fixtures 2 is explained. As shown in FIG. 11A, it is assumed that a user's touch operation is a single stroke of operation pattern that surrounds two or more icons 2a with some lighting fixtures 2 of the all lighting fixtures 2 divided into groups. In this case, as shown in FIG. 11B, the lighting fixtures 2 corresponding to the newly surrounded icons 2a are grouped into one group. Lighting conditions for the new group follow lighting conditions for lighting fixtures 2 corresponding to the biggest group.

Figure 12A:
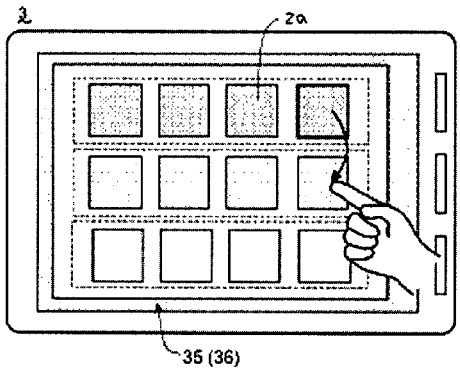
FIGS. 12A and 12B illustrate a screen display example in the controller, showing another setting operation for grouping lighting fixtures.
Figure 12B:
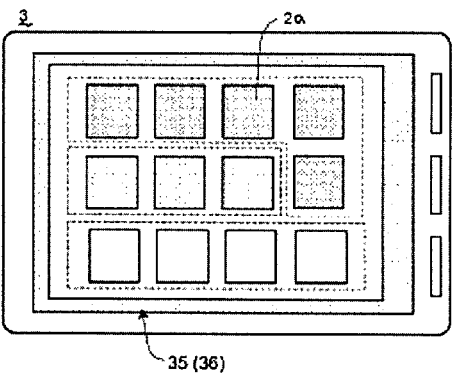

As shown in FIG. 12A, it is assumed that a user touches and drags an icon 2a corresponding to a lighting fixture 2 onto another icon 2a. In this case, as shown in FIG. 12B, the lighting condition for the lighting fixture 2 (a first lighting fixture) corresponding to the touched and dragged icon 2a is applied to the lighting fixture 2 (a second lighting fixture) corresponding to the destination icon 2a of the touched icon 2a. The second lighting fixture 2 is removed from the current group to be included in the group of the first lighting fixture 2a.

Thus, when setting of the group or lighting conditions for the group are changed, the wireless communication unit 31 transmits a control signal to the dimmer 4 so as to change the lighting conditions for the group in addition to linearly changing brightness and colors of the icons 2a on the display unit 35. In this case, the virtual display of the controller 3 with respect to the lighting fixtures 2 corresponds to lighting states of the actual lighting fixtures 2 in real time. Therefore, a user can easily and intuitively set a dimming level and a color temperature of an illumination light of each lighting fixture 2.

Figure 13:
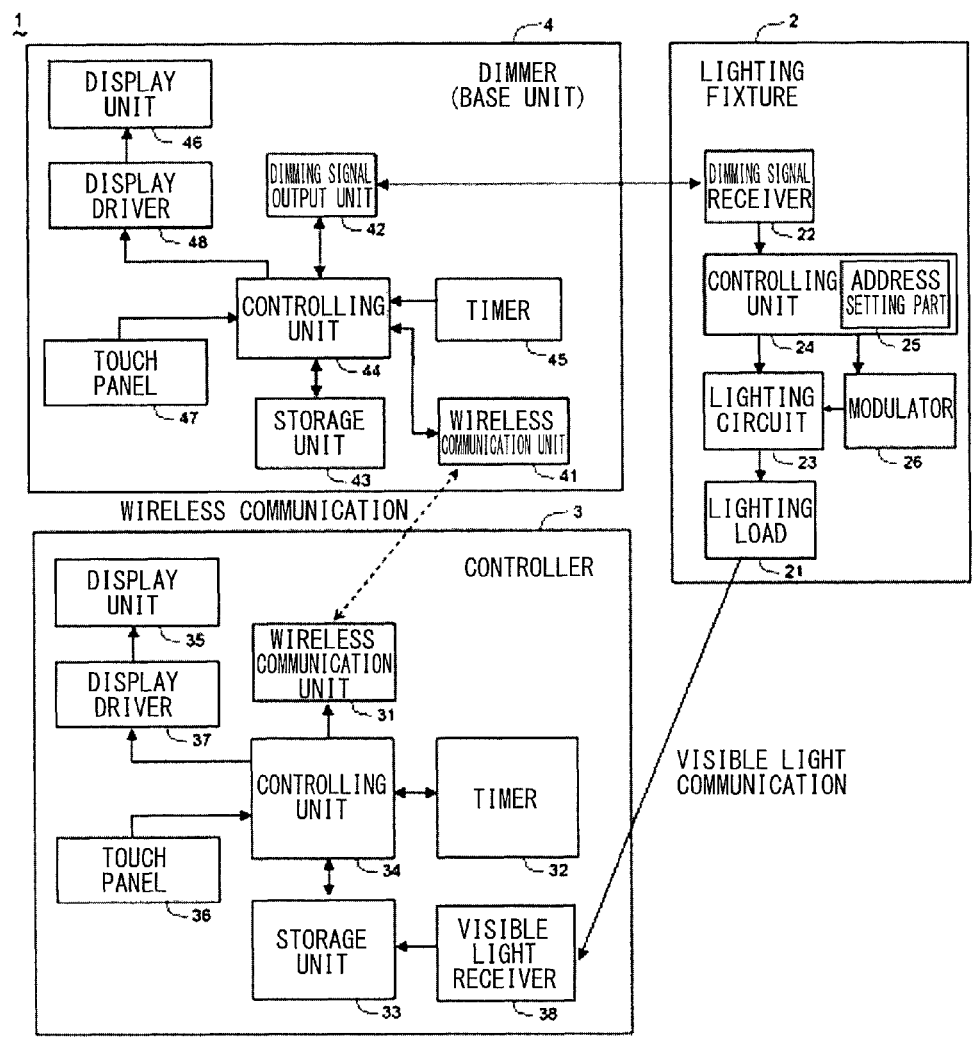
FIG. 13 is a block diagram of a lighting control system in accordance with an embodiment of the present invention.

A lighting control system in accordance with another embodiment of the present invention is explained with reference to FIG. 13. A lighting control system 1 of the embodiment differs from the aforementioned embodiment in that a dimmer 4 of the present embodiment includes a display unit 46, a touch panel 47 and a display driver 48. That is, the dimmer 4 includes a user interface. In the embodiment, it is possible to perform setting of a lighting condition for each lighting fixture 2 and grouping by procedure through the dimmer 4 in the same way as procedures through the controller 3. In the embodiment, a bidirectional communication with a digital dimming signal is performed between a dimming signal output unit 42 and each dimming signal receiver 22. In this case, a state data such as a cumulative lighting time for informing a user of electricity consumption and lamp replacement timing can be transmitted from each lighting fixture 2 to the dimmer 4. Therefore, the dimmer 4 can display information on the state data on the display unit 46, thereby informing the user of electricity consumption and lamp replacement timing.

In the embodiment, it is preferable that a communication between the dimmer 4 and the controller 3 be a bidirectional communication. In this case, the dimmer 4 and the controller 3 can easily share information. For example, the controller 3 can transmit image information of the lighting fixtures 2 to the dimmer 4. The dimmer 4 can transmit scene reproduction data to the controller 3, and a user can change the scene reproduction data through the controller 3 to return the changed data to the dimmer 4 through the controller 3. Therefore, the convenience of the lighting control system can be enhanced. In addition, the state data transmitted from each lighting fixture 2 to the dimmer 4 can be transmitted to the controller 3. The visible light communication from each lighting fixture 2 to the controller 3, namely data transmission range is limited to an area around the lighting fixture 2. If WiFi (trademark) or the like is applied to a wireless communication between the controller 3 and the dimmer 4, the data transmission range can be expanded.

Numerous modifications and variations can be made to the present invention, which is not limited to the aforementioned embodiments. For example, in the aforementioned embodiments, the visible light receiver 38 also functions as the image acquisition unit that is adapted to take a still image of a lighting fixture(s) 2, but the image acquisition unit of the present invention may be separated from the visible light receiver 38. The image acquisition unit is also not limited to an image capturing means such as a camera or the like. For example, the image acquisition unit may be configured to receive an illustration or a 3D-CAD image of a lighting fixture(s) 2 through various information transmission terminals using a flash memory and the like. In the aforementioned embodiments, the virtual display window of the lighting fixtures 2 includes the icons 2a that corresponds to the lighting fixtures 2 and are placed in 2-D space as 2-D images, but the virtual display window may include the icons 2a placed in 3-D space as 3-D images.

The invention claimed is:

1. A lighting control system, comprising:
   a lighting fixture having identification information;
   a controller configured to set a lighting condition for a dimming level and a color temperature of an illumination light of the lighting fixture; and
   a dimmer configured to output a dimming signal for a lighting control of the lighting fixture in accordance with the lighting condition set through the controller, wherein
   the lighting fixture comprises: a lighting load; a dimming signal receiver configured to receive the dimming signal from the dimmer; and a modulator configured to modulate the illumination light of the lighting load to superpose an information signal on the illumination light, said information signal containing an information set of the identification information and lighting information of the lighting fixture,
   the controller comprises: a wireless communication unit configured to transmit a control signal containing the lighting condition of the lighting fixture to the dimmer by a wireless communication; a storage unit that stores the identification information of the lighting fixture and an image of the lighting fixture which are related to each other; a display unit configured to display the image of the lighting fixture; a touch panel configured to enable a user to designate the image displayed on the display unit therethrough; and a visible light receiver configured to receive the illumination light to read the identification information and the lighting information from the information signal superposed on the illumination light,
   the display unit is configured to associate the identification information read through the visible light receiver with the image of the lighting fixture to display the image of the lighting fixture so that the lighting information of the lighting fixture corresponding to the image is reflected, and
   the wireless communication unit is configured, when the touch panel on the image of the lighting fixture displayed on the display unit is operated through a touch operation, to produce a control signal for setting the lighting condition of the lighting fixture related to the image based on an operation pattern thereof to transmit the control signal to the dimmer.

2. The lighting control system of claim 1, wherein the visible light receiver functions as an image acquisition unit configured to acquire the image of the lighting fixture.

3. The lighting control system of claim 2, wherein
   the lighting fixture comprises lighting fixtures, and
   the display unit is configured to display images of the lighting fixtures acquired through the image acquisition unit so that respective lighting information of the lighting fixtures corresponding to the images are reflected.

4. The lighting control system of claim 3, wherein the controller is configured, when one point by the touch operation on the touch panel is a single stroke of operation pattern that surrounds two or more images of images of lighting fixtures displayed on the display unit, to group lighting fixtures related to the surrounded images to set lighting conditions for the grouped lighting fixtures in a lump.

5. The lighting control system of claim 4, wherein the dimmer comprises:
   a storage unit that stores identification information of the lighting fixture and an image of the lighting fixture which are related to each other;
   a display unit adapted to display the image of the lighting fixture; and
   a touch panel configured to enable a user to designate the image displayed on the display unit therethrough.

6. The lighting control system of claim 3, wherein the dimmer comprises:
- a storage unit that stores identification information of the lighting fixture and an image of the lighting fixture which are related to each other;
- a display unit adapted to display the image of the lighting fixture; and
- a touch panel configured to enable a user to designate the image displayed on the display unit therethrough.

7. The lighting control system of claim 2, wherein the dimmer comprises:
- a storage unit that stores identification information of the lighting fixture and an image of the lighting fixture which are related to each other;
- a display unit adapted to display the image of the lighting fixture; and
- a touch panel configured to enable a user to designate the image displayed on the display unit therethrough.

8. The lighting control system of claim 1, wherein the dimmer comprises:
- a storage unit that stores identification information of the lighting fixture and an image of the lighting fixture which are related to each other;
- a display unit adapted to display the image of the lighting fixture; and
- a touch panel configured to enable a user to designate the image displayed on the display unit therethrough.

* * * * *